(12) United States Patent
Choi (10) Patent No.: US 11,900,858 B2
(45) Date of Patent: Feb. 13, 2024

(54) POWER MANAGEMENT INTEGRATED CIRCUIT AND DISPLAY DEVICE INCLUDING THE SAME

(71) Applicant: LX Semicon Co., Ltd., Daejeon (KR)

(72) Inventor: Jung Min Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/091,066

(22) Filed: Dec. 29, 2022

(65) Prior Publication Data

US 2023/0215340 A1 Jul. 6, 2023

(30) Foreign Application Priority Data

Dec. 31, 2021 (KR) .......................... 10-2021-0193824

(51) Int. Cl.
*G09G 3/20* (2006.01)
*G06F 3/041* (2006.01)
*G06F 3/044* (2006.01)

(52) U.S. Cl.
CPC .......... *G09G 3/2096* (2013.01); *G06F 3/0412* (2013.01); *G06F 3/04166* (2019.05); *G06F 3/044* (2013.01); *G09G 2310/0289* (2013.01); *G09G 2310/06* (2013.01); *G09G 2330/021* (2013.01); *G09G 2330/028* (2013.01); *G09G 2354/00* (2013.01)

(58) Field of Classification Search
CPC .... G06F 3/0412; G06F 3/04166; G06F 3/044; G09G 3/2096; G09G 2310/0289; G09G 2310/06; G09G 2330/021; G09G 2330/028; G09G 2354/00
See application file for complete search history.

(56) References Cited

U.S. PATENT DOCUMENTS

| | | | |
|---|---|---|---|
| 2017/0102825 A1* | 4/2017 | Kim | .................... G06F 3/04166 |
| 2017/0329167 A1 | 11/2017 | Kim et al. | |
| 2019/0121476 A1 | 4/2019 | Jang et al. | |
| 2020/0019270 A1* | 1/2020 | Shin | ....................... G06F 1/3262 |
| 2020/0401004 A1* | 12/2020 | Kang | .................... G09G 3/3655 |
| 2020/0401258 A1 | 12/2020 | Kang et al. | |
| 2021/0004103 A1* | 1/2021 | Jang | ..................... G06F 3/04184 |
| 2021/0118391 A1* | 4/2021 | Ahn | ....................... G09G 3/3655 |

* cited by examiner

*Primary Examiner* — Hong Zhou
(74) *Attorney, Agent, or Firm* — POLSINELLI PC

(57) ABSTRACT

The present disclosure relates to a power management circuit including a multiplexer and a power converter, and can provide technology that implements a multiplexer selecting and outputting input power to the power management circuit and a power converter controlling input voltage of a timing controller as one integrated circuit.

17 Claims, 9 Drawing Sheets

| | Normal Mode | Sleep Mode |
|---|---|---|
| Display Status | ON | OFF |
| Touch Status | ON | ON |
| V_display | ON | OFF |
| V_touch | ON | ON |

| | Normal Mode | Sleep Mode #1 | Sleep Mode #2 | Sleep Mode #3 |
|---|---|---|---|---|
| Display Status | ON | OFF | OFF | OFF |
| Touch Status | ON | ON | ON | OFF |
| V_display | ON | OFF | OFF | OFF |
| V_touch | ON | ON | ON | ON |
| BUCK & LDO | ON | OFF | OFF | OFF |
| VGH | ON | ON | VGH_M | OFF |
| VDD | ON | ON | VDD_M | OFF |
| VCOM | ON | ON | VCOM_M | OFF |
| VGL | ON | ON | VGH_M | OFF |
| IO & LOGIC | ON | ON | ON | ON |

FIG. 9

POWER MANAGEMENT INTEGRATED CIRCUIT AND DISPLAY DEVICE INCLUDING THE SAME

CROSS-REFERENCE TO RELATED APPLICATION

This application claims the priority of Korean Patent Application No. 10-2021-0193824 filed on Dec. 31, 2021, which is hereby incorporated by reference in its entirety.

BACKGROUND

Field of the Disclosure

The present disclosure relates to a power management integrated circuit and a display device including the same.

Field of the Disclosure

A display device capable of a touch input on a display screen, e.g., a touch/display device, is applied to various electronic devices.

The touch/display device can implement touch and display functions in various forms by using an on-cell scheme by attaching a touch panel to a display panel or using an in-cell scheme which embeds a touch electrode in the display panel.

A touch and a display can be simultaneously implemented in one device by using some of the common electrodes of the touch/display device as the touch electrode, and one time interval is time-divided into a display driving period of transmitting an image signal to a common electrode and a touch driving period of transmitting a touch driving signal to the touch electrode to control an operation cycle of the touch and the display.

In order to reduce power consumption of the display device, power needs to be supplied differently in a time interval displayed by the display device and a time interval of touch driving. When the display device performs a display operation, power for touch sensing is also jointly consumed, and even when the display device performs a touch sensing operation, power for the display is also jointly consumed, so when power supplied regardless of the type of operation of the display device is not controlled, there is a problem in that the power consumption of a panel increases.

Further, even when power for display driving and power for touch driving are separately supplied in the display device, the power consumption is reduced by appropriately designing an operation and a component of a power management integrated circuit inside the display device according to a driving mode of the panel, e.g., a normal driving mode, a sleep driving mode, and a deep sleep driving mode, etc., and a size of a circuit needs to be reduced.

The above information disclosed in this Background section is only for enhancement of understanding of the background of the described technology and therefore it may contain information that does not form prior art that is already known to a person of ordinary skill in the art.

SUMMARY

Accordingly, the present disclosure is to provide a power management integrated circuit and a display device including the same, which can distinguish and receive the type of voltage transmitted from an external host, and appropriately control an operation of an internal circuit of a display device according to a driving mode of a panel, e.g., a normal driving mode, a sleep driving mode, a deep sleep driving mode, etc.

The present disclosure is also to provide a power management integrated circuit and a display device including the same, which reduce a size of a circuit component by including a multiplexer in a power management integrated circuit, and enable low power consumption by dynamically using a common buck circuit.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a power management integrated circuit includes a multiplexer receiving display voltage or touch voltage transferred by a host, selecting one of the display voltage and the touch voltage, and outputting multiplexer output voltage; a buck circuit receiving the multiplexer output voltage, reducing a signal level of the multiplexer output voltage, and generating driving voltage of a timing controller, and a voltage modulation circuit receiving the multiplexer output voltage and generating gate high voltage VGH, gate low voltage VGL, common voltage VCOM, and touch/display driving voltage VDD, in which the voltage modulation circuit modulates and outputs a waveform of at least one of the gate high voltage VGH, the gate low voltage VGL, the common voltage VCOM, and the touch/display driving voltage VDD.

In another aspect of the present disclosure, a power management integrated circuit includes a multiplexer receiving first input voltage in a first driving mode, receiving second input voltage in a second driving mode, selecting one of the first input voltage and the second input voltage, and outputting the selected input voltage as multiplexer output voltage, a buck circuit lowering a signal level of the multiplexer output voltage and transferring the multiplexer output voltage to a timing controller; and a source readout voltage modulation circuit changing a signal waveform of the multiplexer output voltage and generating modulated touch/display driving voltage VDD_M and common voltage VCOM_M, in which the source readout voltage modulation circuit provides the modulated touch/display driving voltage VDD_M and the modulated common voltage VCOM_M to the source readout circuit so as to perform both display driving and touch driving in the first driving mode.

In a further aspect of the present disclosure, a display device includes a source readout circuit performing a touch/display operation of a panel, a timing controller determining a timing of the touch-display operation of the source readout circuit, a power management integrated circuit generating voltage transferred to the timing controller or the source readout circuit; and a touch microcontroller unit controlling an operation of the power management integrated circuit, in which the power management integrated circuit includes a multiplexer selectively outputting first input voltage or second input voltage, a buck circuit receiving an output signal of the multiplexer, controlling a signal level, and providing the output signal to the timing controller, and a voltage modulation circuit disposed separately from the buck circuit and determining a signal waveform transferred to the source readout circuit.

As described above, according to the present disclosure, a touch/display operation can be performed by selecting an appropriate input power according to a driving mode of a panel in a power management integrated circuit receiving a plurality of input powers.

In the present disclosure, even in a source read-out circuit in which a circuit performing a touch function and a circuit performing a display function are combined, required driving voltage can be generated and provided according to the driving mode of the panel, e.g., a normal driving mode, a sleep driving mode, a deep sleep driving mode, etc.

In addition, according to the present disclosure, a multiplexer is included in a power management integrated circuit to reduce a size of an entire circuit, and low-power driving can be enabled.

Further, according to the present disclosure, the sizes of components and the number of components of a circuit required can be reduced by dynamically using a buck circuit and a voltage modulation circuit inside the power management integrated circuit, and manufacturing cost and the size of a printed circuit board (PCB) can be reduced.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
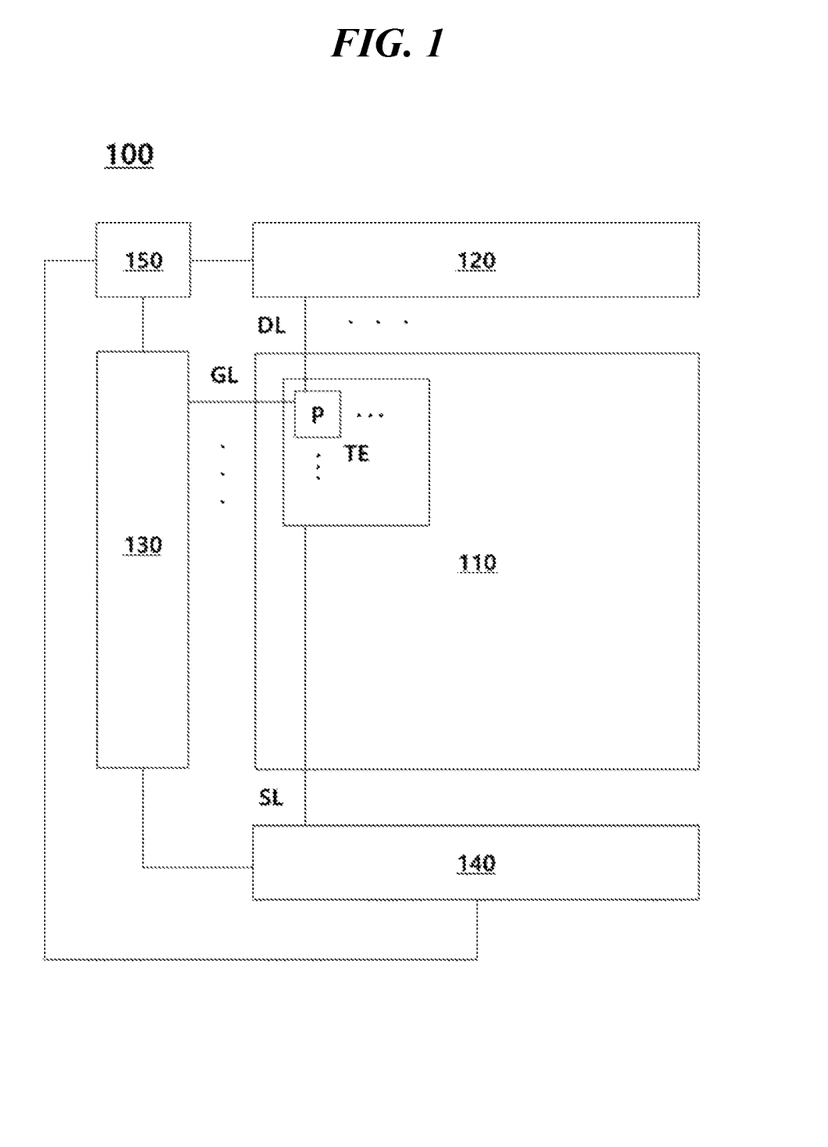
FIG. 1 is a configuration diagram of a display device according to an aspect of the present disclosure.

FIG. 1 is a configuration diagram of a display device according to the present disclosure.

Referring to FIG. 1, the display device 100 may include a panel 110, a data driving circuit 120, a gate driving circuit 130, a touch circuit 140, a touch/display control circuit 150, etc.

A plurality of data lines DL connected to the data driving circuit 120 may be formed in the panel 110, and a plurality of gate lines GL connected to the gate driving circuit 130 may be formed. Further, in the panel 110, multiple pixels P corresponding to a cross point of the plurality of data lines DL and the plurality of gate lines GL may be defined.

In each pixel P, a transistor may be formed in which a first electrode (e.g., a source electrode or a drain electrode) is connected to the data line DL, a gate electrode is connected to the gate line GL, and a second electrode (e.g., the drain electrode or the source electrode) is connected to a display electrode.

Further, a plurality of touch electrode TE may be further formed to be spaced apart from each other in the panel 110. One pixel P may also be located or multiple pixels P may also be located in a region where the touch electrode TE is located.

The panel 110 may include a display panel and a touch screen panel (TSP), and here, the display panel and the TSP may share some components with each other. For example, the plurality of touch electrode TE may be one component (e.g., a common electrode applying common voltage) of the display panel and simultaneously, may be one component (a touch electrode for sensing a touch) of the TSP. Further, the panel 110 as a form in which some components of the display panel and the TSP are shared with each other may be an in-cell type panel, but is not limited thereto.

The data driving circuit 120 may receive a data control signal of the touch/display control circuit 150, and supply a data signal to the data line DL in order to display an image in each pixel P of the panel 110. The data driving circuit 120 may be defined as a source driver integrated circuit (SDIC) as necessary.

The gate driving circuit 130 may receive a gate control signal of the touch/display control circuit 150, and sequentially supplies a scan signal to the gate line GL in order to turn on or turn off a transistor located in each pixel P. The gate driving circuit 130 may be defined as a gate driver integrated circuit (GDIC) as necessary.

The touch circuit 140 may apply a touch driving signal to all or some of the plurality of touch electrodes TE connected to a sensing line SL.

In order for the touch circuit 140 to apply the touch driving signal to all or some of the plurality of touch electrodes TE, the sensing line SL may be required to be connected to each of the plurality of touch electrodes TE. As a result, the sensing line SL connected to each of the plurality of touch electrodes TE to transmit the touch driving signal may be formed in the panel 110 in a first direction (e.g., a vertical direction) or a second direction (e.g., a horizontal direction).

The touch circuit 140 may include a readout integrated circuit (ROIC), a touch microcontroller unit (TMCU), etc.

The ROIC may transmit a touch driving signal STX to the panel 110 to the touch electrode TE through the touch driving circuit, and receive a touch sensing signal SRX from the touch electrode TE through a touch sensing circuit.

The ROIC may receive the touch sensing signal SRX having a size corresponding to a change in capacitance in the form of current or voltage, and demodulate the received touch sensing signal and generate touch data and transmit the generated touch data to the TMCU.

The touch circuit 140 may determine whether there is the touch, a touch position, a touch strength, a touch interval, etc., according to the change in capacitance of the touch electrode by a touch or access of an object.

Meanwhile, the display device 100 may adopt an electrostatic touch scheme that detects the change in capacitance through the touch electrode TE to recognize the access or touch of the object. The electrostatic touch scheme may include a mutual capacitance touch scheme and a self capacitance touch scheme, and a predetermined electrostatic touch scheme may be applied to the present disclosure.

Meanwhile, the display device 100 may time-division drive the touch electrode TE by distinguishing a display time interval and a touch time interval. As an example, the touch circuit 140 of the display device 100 may not apply a driving signal to all or some of the touch electrodes in an interval of supplying the data signal to the touch circuit 140.

Further, the display device 100 may drive the touch electrode TE without distinguishing a display interval and a touch interval. As an example, the touch circuit 140 of the display device 100 may apply the driving signal to all or some of the touch electrodes in the interval of supplying the data signal to the touch circuit 140.

The touch/display control circuit 150 may supply various control signals to the data driving circuit 120, the gate driving circuit 130, and the touch circuit. The touch/display control circuit 150 may transmit a data control signal (DCS) for controlling the data driving circuit 120 to supply data voltage to each pixel P according to each timing, transmit a gate control signal (GCS) to the gate driving circuit 130, or transmit the sensing signal to the touch circuit 140. The touch/display control circuit 150 may be a timing controller (T-Con) or may further perform even another control function including the timing controller.

Figure 2:
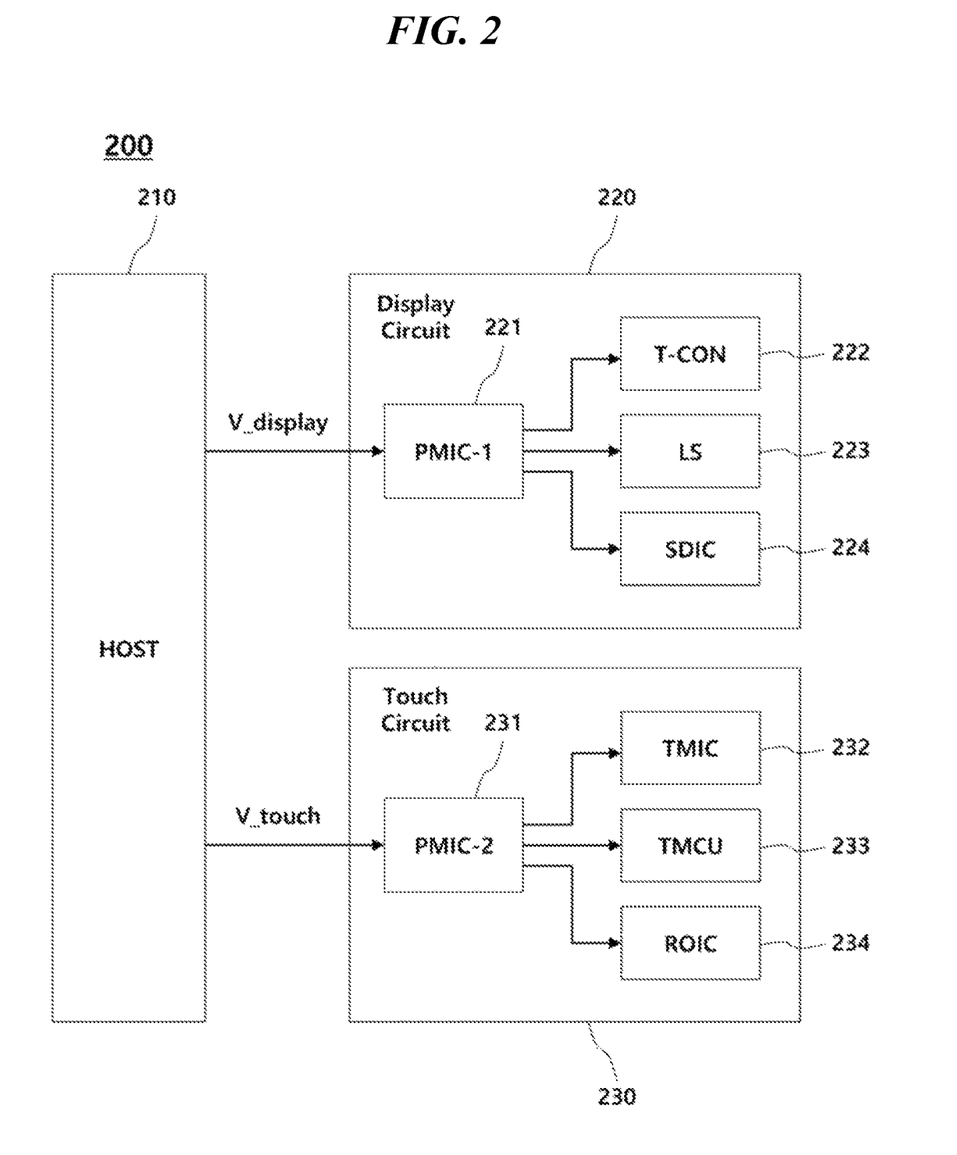
FIG. 2 is a configuration diagram of a display device according to another aspect of the present disclosure.

FIG. 2 is a configuration diagram of a display device according to another aspect of the present disclosure.

Referring to FIG. 2, the display device 200 according to another aspect of the present disclosure may include a host 210, a display circuit 220, a touch circuit 230, etc.

In the display device 200, the display circuit 220 and the touch circuit 230 may be interchangeably used in terms of a configuration or a function, so a power signal transferred from the host 210 may also be interchangeably used.

The host 210 may supply a separate power signal to each of the display circuit 220 and the touch circuit 230, and power voltage transferred to the display circuit 220 may be defined as display voltage V_display and voltage transferred to the touch circuit 230 may be defined as touch voltage V_touch.

Each of the display circuit 220 and the touch circuit 230 may generate driving voltage for driving each circuit from the power voltage received from the host 210, and transfer the generated driving voltage to circuits inside the display device, such as a timing controller 222, a level shifter 223, an SDIC 224, a touch modulation circuit (TMIC) 232, a TMCU 233, a readout integrated circuit 234, etc.

The display voltage V_display and the touch voltage V_touch transferred by the host 210 may be transferred to a first power management integrated circuit (PMIC-1) 221 and a second power management integrated circuit (PMIC-2) 231, and the first power management integrated circuits 221 and the second power management integrated circuit 231 may modulate and output the size, a waveform, etc., of input voltage or input current.

The first power management integrated circuit 221 and the second power management integrated circuit 231 may change and supply voltage applied to each circuit differently according to the type of power input from the host 210. The first power management integrated circuit 221 and the second power management integrated circuit 231 may include one or more booster circuits in order to increase output voltage, and may include one or more buck circuits in order to decrease the output voltage.

The host 210 may provide each power in the form of the voltage and the current, main power may have main voltage of approximately 3.3 V, and sub power may have sub voltage of 3.3 V. Since power consumption required in a display operation of the display device 200 is much larger than the power consumption in a touch operation, display current may be larger than touch current even though a magnitude of the voltage is equal.

In the display circuit 220, a first power management integrated circuit 221 may control strengths, waveforms, timings, etc., of the driving signals of the timing controller 222, the level shifter 223, and the SDIC 224.

The timing controller 222 may generate signals for controlling operations of the SDIC 224, the readout integrated circuit 234, the GDIC (not illustrated), etc.

The level shifter 223 may control a level of a signal transferred to the GDIC (not illustrated), etc.

The SDIC 224 may convert a digital signal transferred from the timing controller 222 into an analog signal, and supply data voltage or data current to the pixel P of the panel to display the image.

In the touch circuit 230, the second power management integrated circuit 231 may control strengths, waveforms, timings, etc., of the touch modulation circuit 232, the TMCU 233, and the readout integrated circuit 234.

The touch modulation circuit 232 may synchronize and modulate the touch signal and signals in the panel.

The TMCU 233 may be a circuit that processes the touch sensing signal received by the readout integrated circuit 234 as the digital signal.

The readout integrated circuit 234 may be a circuit that senses the change in capacitance of the touch electrode, and demodulates the capacitance change to generate the touch data.

As illustrated in FIG. 2, when the display circuit 220 and the touch circuit 230 are separated from each other, for example, the display voltage V_display and the touch voltage V_touch are transferred to the separated circuits, respectively, in an add-on or on-cell type panel, so efficient power using may be impossible according to the driving mode of the panel.

When the driving mode of the panel is a normal mode, both the display voltage V_display and the touch voltage V_touch are received to operate both the display circuit 220 and the touch circuit 230, when the driving mode of the panel is a sleep mode, the display voltage V_display is not received and the touch voltage V_touch is received to operate only the touch circuit 230, and in the deep sleep mode, output voltage of a logic circuit modulating the touch voltage V_touch transferred from the host 210 is received to implement a minimum function, and a signal for switching the driving mode of the panel may be transmitted and received by communication with the host 210 by USB communication, I2C communication, etc.

In such a case, since a separate switch (not illustrated) should be further included in order to maintain the display circuit 220 in an off state or modulate the voltage in the touch modulation circuit 233, there is a problem in that the size of a circuit configuration increases, and when the separate switch (not illustrated) is not included, there is a problem in that continuous power consumption is generated in the display circuit 220.

Figure 3:
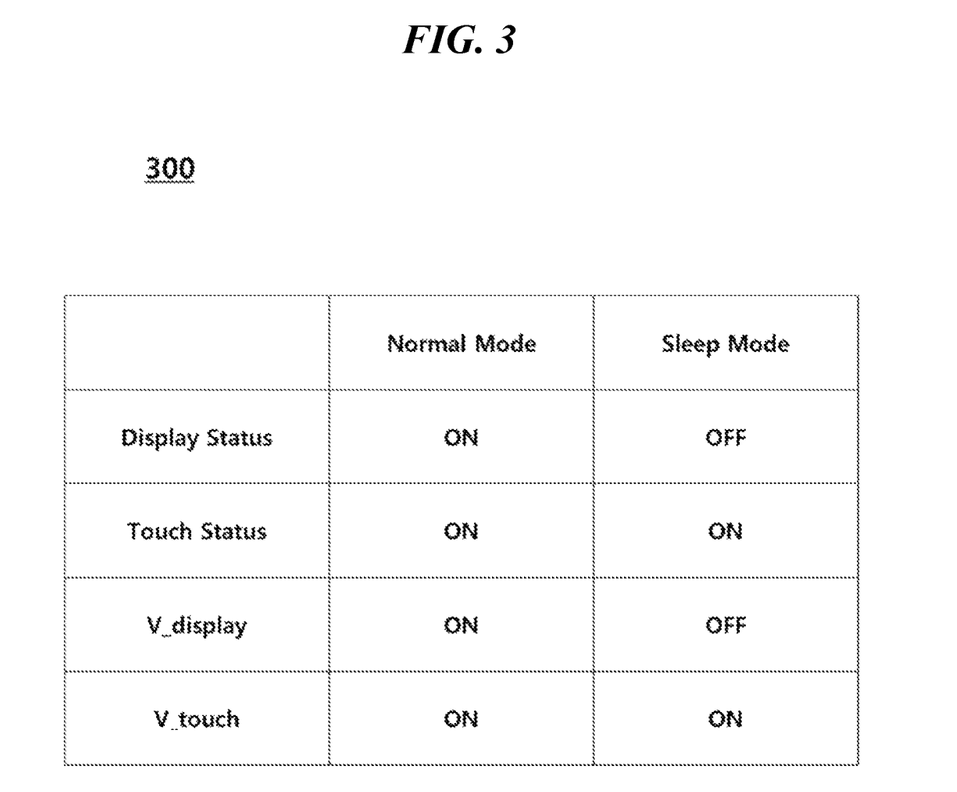
FIG. 3 is a diagram for describing a driving mode of a panel according to the present disclosure.

FIG. 3 is a diagram for describing a driving mode of a panel according to the present disclosure.

Referring to FIG. 3, the driving mode 300 of the panel may be divided into a normal mode, a sleep mode, etc.

The normal mode may refer to a state in which the display device performs both display driving and touch driving, and the sleep mode may refer to a state in which only touch sensing is performed without the display driving.

In the normal mode, both the display circuit and the touch circuit may operate, and in the sleep mode, the display circuit may not operate and only the touch circuit may operate.

Each driving mode of the panel or the display device may be implemented by interrupting or selecting the supply of the power transferred to the display circuit and the touch circuit. For example, in the normal mode, the host may provide both the display voltage V_display and the touch voltage V_touch, and in the sleep mode, the host may provide only the touch voltage V_touch.

Figure 4:
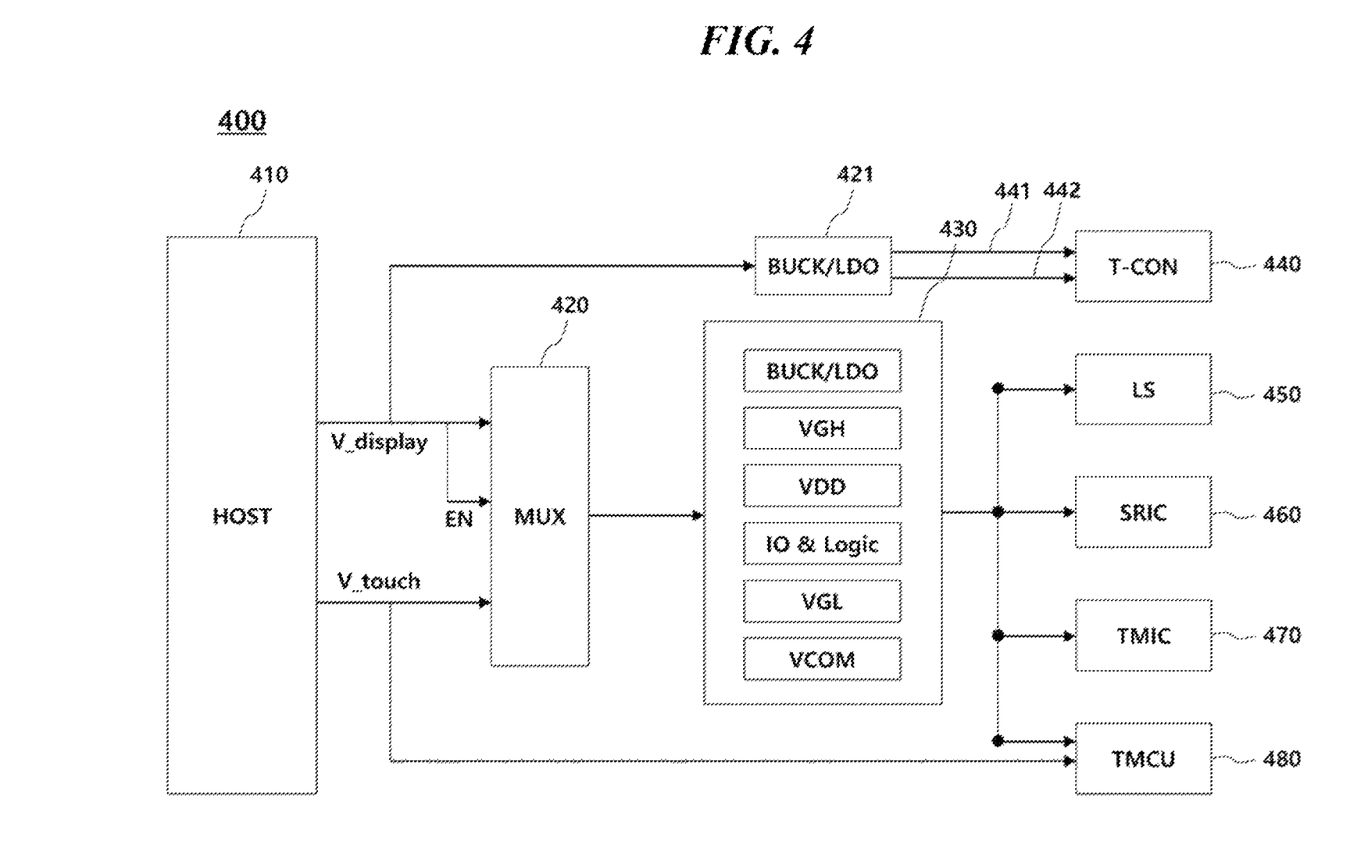
FIG. 4 is a first exemplary configuration diagram of a power management integrated circuit according to the present disclosure.

FIG. 4 is a first exemplary configuration diagram of a power management integrated circuit according to the present disclosure.

Referring to FIG. 4, the display device 400 may include a host 410, a multiplexer 420, a power management integrated circuit 430, a timing controller 440, a level shifter 450, a source readout IC 460, a touch modulation circuit 470, and a TMCU 480.

The host 410 may transfer the display voltage V_display or the touch voltage V_touch to the power management integrated circuit 430. Even when the display device 400 uses the in-cell type panel, each of the display voltage V_display or the touch voltage V_touch may be transferred through a separate signal line like the case of using the on-cell or add-on type panel.

The multiplexer 420 may receive the display voltage V_display or the touch voltage V_touch, and select all or some of the power signals and output the selected power signal to the power management integrated circuit 430.

When the display device 400 has the in-cell type panel in which the display circuit and the touch circuit are combined, and includes the source readout integrated circuit 460, the circuit configuration of the display device 400 including the multiplexer 420 selecting and outputting the display voltage V_display or the touch voltage V_touch may be simplified.

The multiplexer 420 may receive an enable signal EN through a separate signal line connected to the signal line through which the display voltage V_display is transferred. A generation timing of an output signal of the multiplexer 420 may be determined in response to an operation timing of the display voltage V_display.

The power management integrated circuit 430 may control the power transferred to the level shifter 450, the source readout integrated circuit 460, the touch modulation circuit 470, the TMCU 480, etc.

The timing controller 440 may receive the voltage through the separate signal line connected to the signal line through which the display voltage V_display is transferred, and receive the voltage by lowering a signal level through the buck circuit 421 as necessary. In this case, the signal level is controlled by the buck circuit 421 formed separately from the buck circuit inside the power management integrated circuit 430, and as a result, there is a problem that the circuit is complicated.

The buck circuit 421 may be defined as a low drop-output (LDO) regulator, etc., as necessary. The buck circuit 421 may be constituted by a set of a plurality of buck circuits, and a plurality of signal lines 441, 442 are formed to individually control the voltage transferred to the timing controller 440.

For example, when the display voltage transferred to the buck circuit is 3.3 V, the buck circuit 421 may transfer voltage of 1.2 V or 0.9 V to the timing controller 440 through a first buck signal line 441, and transfer voltage of 1.8 V to the timing controller 440 through a second buck signal line 442, but the present invention is not limited thereto.

The buck circuit 421 may reduce a level of an input signal, and the buck circuit 421 is maintained in an off state to interrupt signal transfer as necessary.

In the display device illustrated in FIG. 4, since the multiplexer 420 and the power management integrated circuit 430 should be formed as separate circuits, and a buck circuit (not illustrated) inside the power management integrated circuit 430 and the buck circuit 421 outside the power management integrated circuit 430 should be separately provided, circuit complexity is increased due to a duplicated block.

Further, in the display device illustrated in FIG. 4, since the touch modulation circuit 470 receives signals such as gate high voltage VGH, gate low voltage VGL, touch/display driving voltage VDD, common voltage VCOM, etc., generated by the power management integrated circuit 430, and performs a modulation process, a step of signal processing is increased and the circuit complexity is increased. As components are added and the circuit is complicated, there is also a problem in that the size of the PCB is increased.

Figure 5:
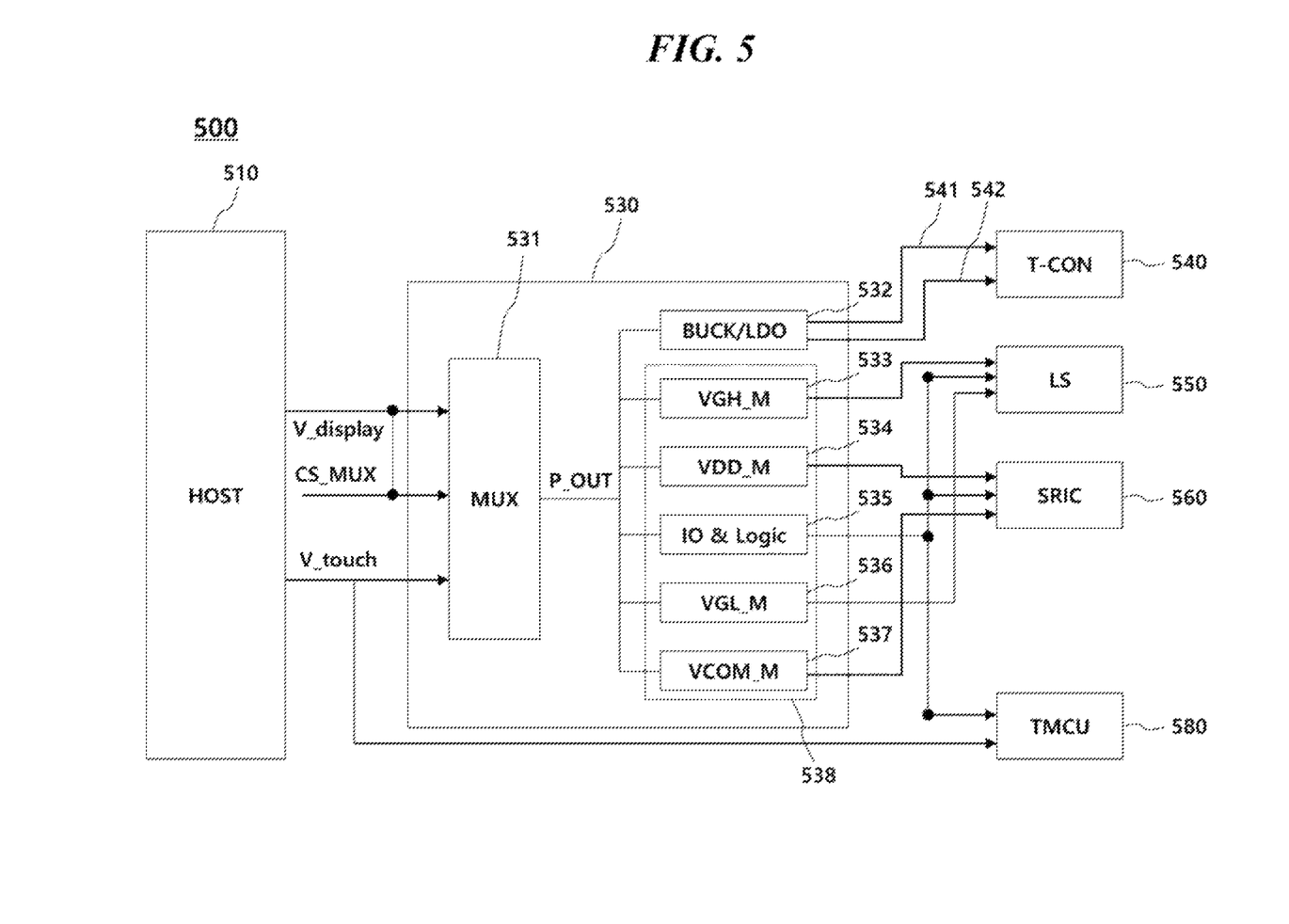
FIG. 5 is a second exemplary configuration diagram of the power management integrated circuit according to the present disclosure.

FIG. 5 is a second exemplary configuration diagram of the power management integrated circuit according to the present disclosure.

Referring to FIG. 5, the display device 500 may include a host 510, a power management integrated circuit 530, a timing controller 540, a level shifter 550, a source readout IC 560, a TMCU 580, etc.

The host 510 may transfer the display voltage V_display or the touch voltage V_touch to the power management integrated circuit 530.

The power management integrated circuit 530 includes the multiplexer 531 therein to reduce the circuit size and perform an input voltage selection function illustrated in FIG. 4. Two input ports or input signal lines may be formed in order for the power management integrated circuit 530 to include the multiplexer 531 therein.

The multiplexer 531 may receive the display voltage V_display or the touch voltage V_touch transferred by the host 510, and select one of the display power voltage/current and the touch voltage/current, and generate and output multiplexer output voltage P_OUT.

The multiplexer 531 may receive the display voltage V_display in a first driving mode of the panel, e.g., the normal mode, and receive the touch voltage V_touch in a second driving mode of the panel, e.g., the sleep mode. The multiplexer 531 may receive all of respective voltages and selectively output only a specific voltage as necessary.

When the multiplexer 531 receives both the display voltage V_display and the touch voltage V_touch in the first driving mode of the panel, the multiplexer 531 may select and output any one signal, e.g., the display voltage V_display. The multiplexer 531 receives the display voltage V_display as the enabled signal through a separate signal line forming a node common with the signal line through which the display voltage V_display is transferred to determine the generation timing of the multiplexer output voltage P_OUT. Further, the multiplexer 531 may independently determine the multiplexer output voltage P_OUT in response to the signal of the timing controller 540 or the TMCU 580.

For example, the multiplexer 531 may change a state and a type of the multiplexer output voltage P_OUT in response to a timing of a rising edge or a falling edge of a timing synchronization signal Tsync generated by the timing controller 540. In this case, an input/output timing of each signal may be elaborately controlled, and each timing may be synchronized.

For example, when the multiplexer 531 recognizes that the touch occurs for a period of time or more, which is set in the TMCU, the multiplexer 531 determines that the driving mode deviates from the sleep mode, and changes the driving mode of the panel from the sleep mode to the normal mode and changes the state and the type of the multiplexer output voltage P_OUT at the same timing thereas.

For example, the multiplexer 531 may transfer a multiplexer control signal CS_MUX and change the state of the multiplexer output voltage P_OUT. As necessary, when the signal line through which the display voltage V_display is transferred and the signal line, through which the multiplexer control signal CS_MUX is transferred, are connected, the multiplexer 531 may receive the display voltage V_display and/or the multiplexer control signal CS_MUX as the enable signal.

The power management integrated circuit 530 may include a buck circuit 532, a gate high voltage generation circuit 533, a driving voltage generation circuit 534, a logic circuit 535, a gate low voltage generation circuit 536, a common voltage generation circuit 537, etc., therein.

The buck circuit 532 is integrated inside the power management integrated circuit 530 to receive the multiplexer output voltage P_OUT output by the multiplexer 531, and reduce the signal level and generate the driving voltage of the timing controller 540. The buck circuit 531 may be constituted by a set of a plurality of buck circuits, and a plurality of signal lines 541, 542 are formed to individually control the voltage transferred to the timing controller 540.

The buck circuit 532 may generate the driving voltage of the timing controller 540 in the first driving mode of the panel, e.g., the normal mode, and not generate the driving voltage of the timing controller 540 in the second driving mode of the panel, e.g., the sleep mode. The buck circuit 532 may control whether to generate the driving voltage of the timing controller 530 by an internal or external switch (not illustrated).

The buck circuit 532 may further include a switch circuit (not illustrated) that selectively interrupts the multiplexer output voltage P_OUT in response to the operation of the multiplexer 531. The buck circuit 532 selectively interrupts the power transferred to the timing controller 540 according to the driving mode of the panel to improve power efficiency.

The buck circuit 532 which performs various operations for one circuit may be implemented to enable dynamic block on.

The buck circuit 532 may be formed in which the buck circuit formed outside the power management integrated circuit 530 is integrated inside the power management integrated circuit 530. In FIG. 5, since the buck circuit is not disposed outside the power management integrated circuit 530, but the level of the driving signal transferred to the timing controller 540 may be controlled by the buck circuit 532 inside the power management integrated circuit 530, the circuit size is reduced and a circuit having a duplicated function is removed to simplify the circuit.

The voltage modulation circuit 538 may be a circuit including at least one of the gate high voltage generation circuit 533, the driving voltage generation circuit 534, the logic circuit 535, the gate low voltage generation circuit 536, and the common voltage generation circuit 537. Further, the voltage modulation circuit 538 may be disposed on the PCB of the power management integrated circuit 530.

The voltage modulation circuit 538 may receive the multiplexer output voltage P_OUT, and output gate high voltage VGH generated by the gate high voltage generation circuit 533, touch/display driving voltage VDD generated by the driving voltage generation circuit 534, gate low voltage VGL generated by the gate low voltage generation circuit 536, common voltage VCOM generated by the common voltage generation circuit 537, etc.

Further, the voltage modulation circuit 538 may modulate and output the waveform of at least one of the gate high voltage VGH, the gate low voltage VGL, the common voltage VCOM, and the touch/display driving voltage VDD.

The voltage modulation circuit 538 may transfer modulated gate high voltage VGH _M and modulated gate low voltage VGL_M to the level shifter 550, and transfer modulated common voltage VCOM_M and modulated touch/display driving voltage VDD_M to the source readout circuit 560.

The logic circuit 535 may transfer voltage having different magnitude from the display voltage V_display and the touch voltage V_touch, e.g., the voltage of 1.8 V to the level shifter 550, the source readout integrated circuit 560, and the TMCU 580 independently from the buck circuit 532.

The TMCU 580 may acquire touch information based on the touch sensing signal of the source readout integrated circuit 560, and compute whether there is the touch, the touch strength, the touch time, etc., and change the driving mode of the panel.

The TMCU 580 may generate the touch control signal and transfer the generated touch control signal to the power management integrated circuit 530, and turn on or turn off an output of the buck circuit 532 in response thereto.

As in FIG. 5, the multiplexer 531 is included in the power management integrate circuit 530 to reduce the PCB size of the circuit and reduce signal interference.

Further, as in FIG. 5, the buck circuit 532 is commonly used to reduce a used component quantity.

Further, in FIG. 5, a separate modulation circuit (not illustrated) is not included outside the power management integrated circuit 530, and the voltage is modulated by the voltage modulation circuit 538 in advance therein to shorten a signal processing time. Further, the touch modulation circuit (not illustrated) may perform a function of modulating the voltage by receiving the gate high voltage VGH, the gate low voltage VGL, the common voltage VCOM, etc., and in this process, a separate control switch (not illustrated), a separate resistor (not illustrated), etc., may be further required, so the voltage modulation function is performed inside the power management integrated circuit 530 to improve signal processing performance.

Figure 6:
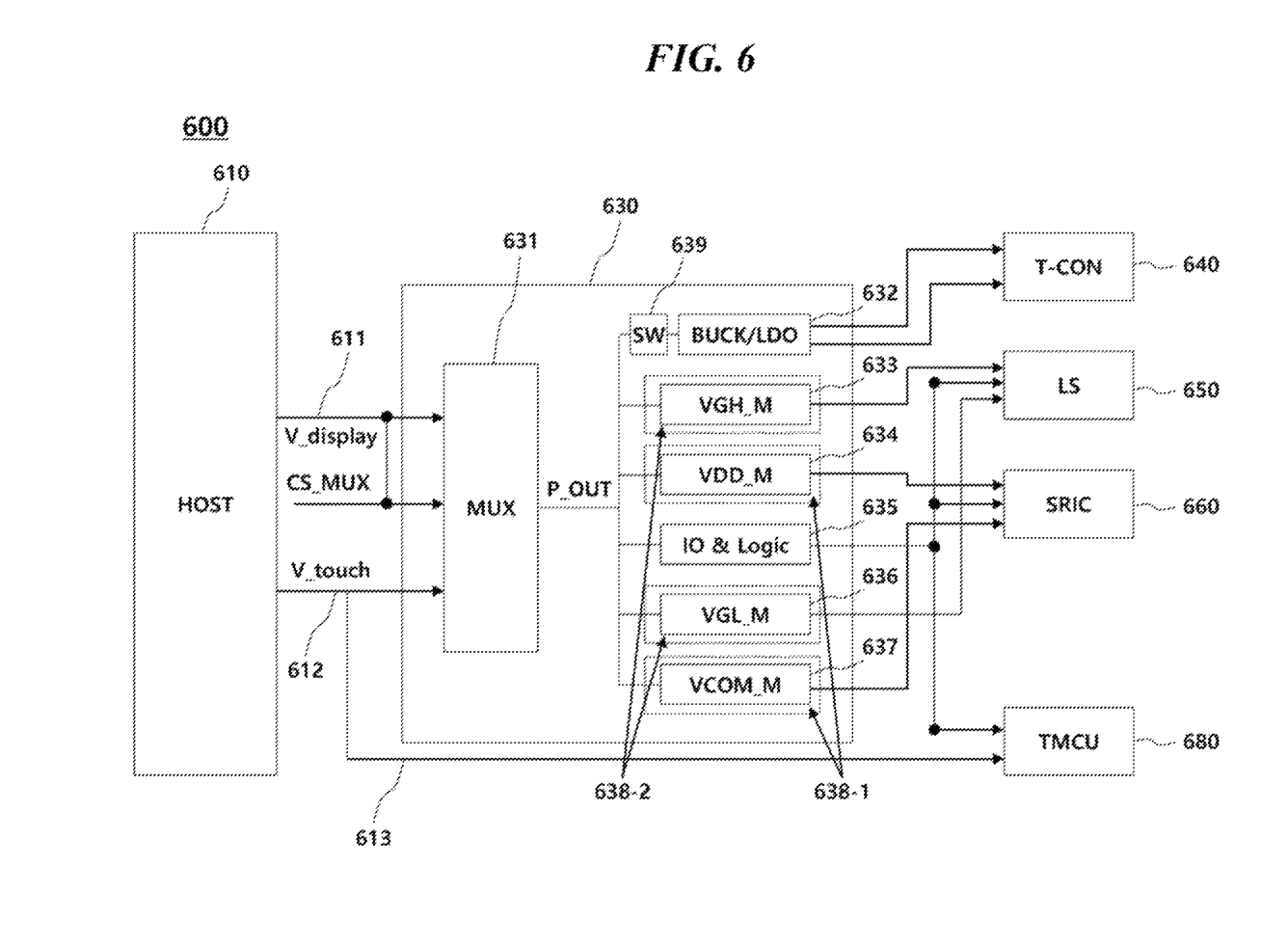
FIG. 6 is a third exemplary configuration diagram of the power management integrated circuit according to the present disclosure.

FIG. 6 is a third exemplary configuration diagram of a power management integrated circuit according to the present disclosure.

Referring to FIG. 6, the display device 600 may include a host 610, a power management integrated circuit 630, a timing controller 640, a level shifter 650, a source readout IC 660, a TMCU 680, etc.

The host 610 may transfer the display voltage V_display to the power management integrated circuit 630 through a first input signal line 611, and transfer the touch voltage V_touch to the power management integrated circuit 630 through a second input signal line 612.

The second input signal line 612 forms a common node with a third input signal line 613, and is connected to a separate signal line to supply the power to the TMCU 680. The third input signal line 613 may be electrically connected to the second input signal line 612, and may transfer the touch voltage V_touch to the TMCU determining the operation timing of the multiplexer 631.

The third input signal line 613 as a signal line supplying the power to the TMCU 680 before transferring the touch voltage V_touch to the multiplexer 631 is formed separately from the first input signal line 611 and the second input signal line 612 to stably supply the power to the TMCU 680 regardless of the selection operation of the multiplexer 631.

Since the touch operation may be performed in both the case where the driving mode of the panel is the normal mode and the case where the driving mode of the panel is the sleep mode, the touch voltage V_touch transferred from the host 610 may be transferred to the TMCU 680 through a separate third input signal line 613.

Further, since the TMCU 680 may determine the operation timing of the multiplexer 631 or control the operation, the TMCU 680 needs to maintain an electrical connection to the third input signal line 613 separated from the second input signal line 612 connected to the multiplexer 631.

The power management integrated circuit 630 may include a multiplexer 631, a buck circuit 632, a gate high voltage generation circuit 633, a driving voltage generation circuit 634, a logic circuit 635, a gate low voltage generation circuit 636, a common voltage generation circuit 637, etc., and generate or control the voltage or current transferred to each circuit configuration.

The power management integrated circuit 630 may selectively turn on/off internal circuits 631, 632, 633, 634, 635, 636, and 637 of the voltage modulation circuit in response to the driving mode of the panel, and control signals transferred to the timing controller 640, the level shifter 650, the source readout integrated circuit 660, and the TMCU 680 may be controlled.

The multiplexer 631 may receive the first input voltage e.g., the display voltage in the first driving mode, e.g., the normal mode and receive the second input voltage, e.g., the touch voltage in the second driving mode, e.g., the sleep mode, and select one of the first input voltage and the second input voltage to output the multiplexer output voltage P_OUT.

The multiplexer 631 receives the multiplexer control signal CS_MUX for selecting the first input voltage or the second input voltage to determine an output timing of the multiplexer output signal P_OUT or determine the type of output signal.

An output port of the multiplexer 631 forms the common node with the buck circuit 632 and a source readout voltage modulation circuit 638-1 to transfer the multiplexer output signal P_OUT.

The buck circuit 632 may control the signal level of the multiplexer output signal P_OUT and transfer the controlled signal level to the timing controller 640.

The buck circuit 632 may be maintained in an on state in the first driving mode, e.g., the normal mode, and maintained in an off state in the second driving mode, e.g., the sleep mode.

The buck circuit 632 may be connected to a switch 639 that changes a connection relationship of the circuit configuration of the display device in response to the first driving mode and the second driving mode.

The switch 639 is disposed inside or outside the buck circuit 632 to interrupt/control the voltage or current transferred to the timing controller 640 or interrupt/control the voltage or current transferred to the buck circuit 632.

The buck circuit 632 may receive the first input voltage in the first mode, transfer the received first input voltage to the timing controller 640 after voltage drop, and interrupt the second input voltage in the second mode by the switch 639.

The source readout voltage modulation circuit 638-1 may include a driving voltage generation circuit 634 and a common voltage generation circuit 637, and determine a signal waveform transferred to the source readout integrated circuit 660.

The source readout voltage modulation circuit 638-1 may change the signal waveform of the multiplexer output voltage P_OUT, and generate the modulated touch/display driving voltage VDD_M and the modulated common voltage VCOM_M.

The source readout voltage modulation circuit 638-1 may provide modulated touch/display driving voltage VDD_M and modulated common voltage VCOM_M to the source readout integrated circuit 660 so as to perform both display driving and touch driving in the first driving mode, e.g., the normal mode.

The source readout voltage modulation circuit 638-1 may transfer the common voltage VCOM to the source readout integrated circuit 660 in the second driving mode, e.g., the sleep mode.

A level shifter voltage modulation circuit 638-2 may include a gate high voltage generation circuit 633 and a gate low voltage generation circuit 636, and determine the signal waveform transferred to the level shifter 650 or a gate driver integrated circuit (not illustrated).

The level shifter voltage modulation circuit 638-2 may change the signal waveform of the multiplexer output voltage P_OUT, and generate modulated gate high voltage VGH_M and modulated gate low voltage VGL_M, and provide the modulated gate high voltage and gate low voltage to the level shifter 650.

It may be appreciated that the source readout voltage modulation circuit 638-1 and the level shifter voltage modulation circuit 638-2 may form one voltage modulation circuit, but are physically or functionally separated according to a signal transfer target and a modulation method of the signal.

The timing controller 640 may determine the timing of the touch operation or the display operation of the source readout integrated circuit 660.

The source readout integrated circuit 660 may perform the touch operation and/or the display operation of the panel.

The TMCU 680 may control the operations of the power management integrated circuit 630, the source readout integrated circuit 660, etc. The TMCU 680 may generate the multiplexer control signal CS_MUX for controlling the multiplexer 631 to output the first input voltage in the first driving mode and control the multiplexer 631 to output the second input voltage in the second driving mode.

Figure 7:
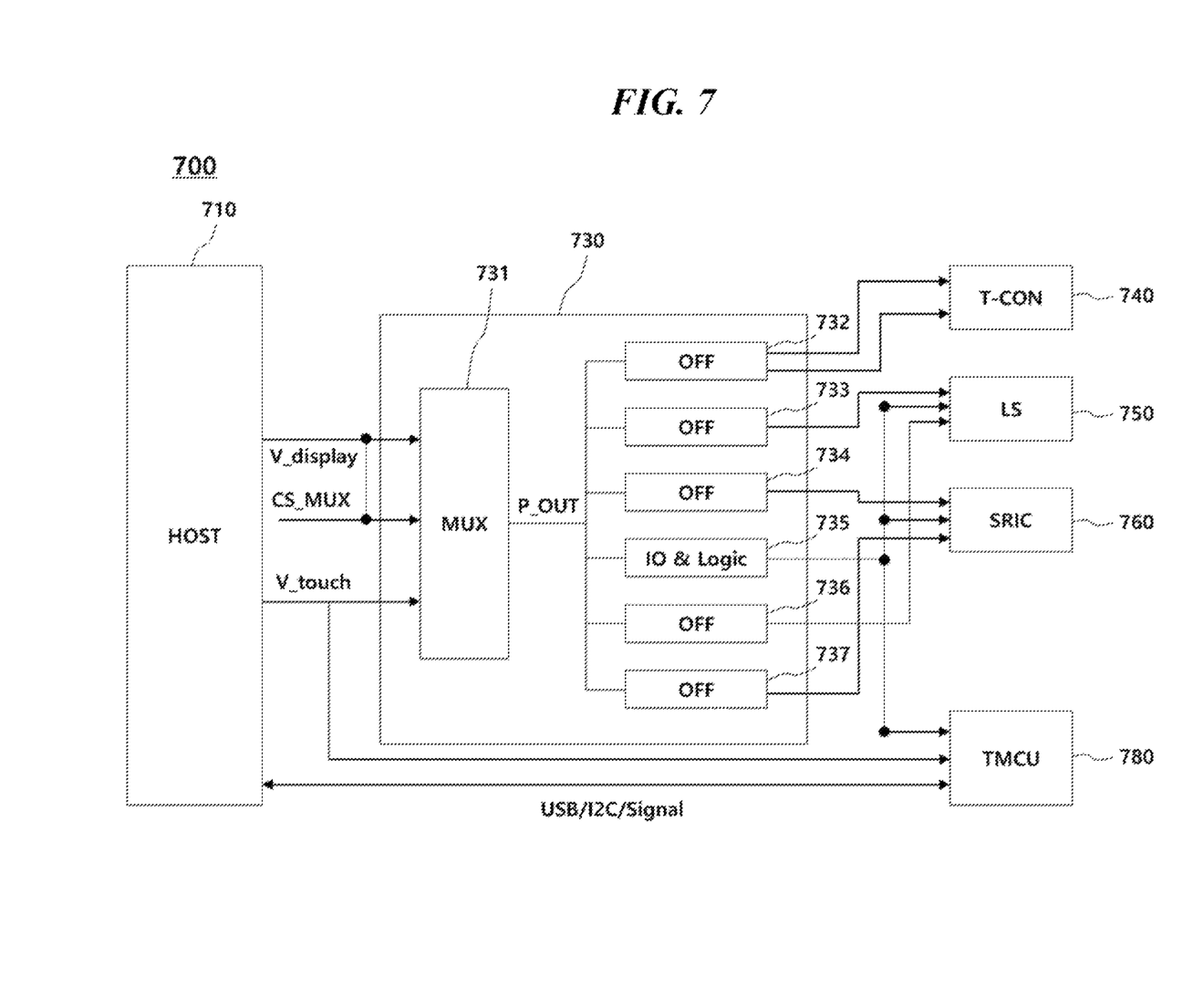
FIG. 7 is a fourth exemplary configuration diagram of the power management integrated circuit according to the present disclosure.

FIG. 7 is a third exemplary configuration diagram of a power management integrated circuit according to the present disclosure.

Referring to FIG. 7, the display device 700 may include a host 710, a power management integrated circuit 730, a timing controller 740, a level shifter 750, a source readout integrated circuit 760, a TMCU 780, etc.

The power management integrated circuit 730 may include a multiplexer 731, a buck circuit 732, a gate high voltage generation circuit 733, a driving voltage generation circuit 734, a logic circuit 735, a gate low voltage generation circuit 736, a common voltage generation circuit 737, etc., and generate or control the voltage or current transferred to each circuit configuration, and the on or off state may be switched according to the driving mode of the panel.

For example, when the panel driving mode is the deep sleep mode, which may be a mode in which both the display and touch functions are maintained to be in the off state, the host 710 directly applies a wake-up signal to the timing controller 740 or the TMCU 780 to wake up the timing controller 740 or the TMCU 780 and reduces the power consumption. The above operation may be implemented by a scheme of maintaining only circuits which communicate with a host interface (I/F), e.g., the power management integrated circuit 730 and the TMCU 780 in the on state, and maintaining the remaining circuits in the off state.

In the deep sleep mode, in order to perform a minimum basic function without performing the display function and the touch function, the buck circuit 732, the gate high voltage generation circuit 733, the driving voltage generation circuit 734, and the gate low voltage generation circuit 736 may be maintained in the off state and the logic circuit 735 may be maintained in the on state.

In the deep sleep mode, the multiplexer 731 may output the touch voltage to the logic circuit 735, and the logic circuit may supply the output voltage only to the TMCU 780. In this case, the TMCU 780 performs the USB communication or the I2C communication with the host 710 to receive a signal for determining whether there is the touch or the touch strength.

The TMCU 780 may receive the touch voltage V_touch through the logic circuit 735 of the power management integrated circuit 730 and receive the touch voltage V_touch through a separate signal line.

Figure 8:
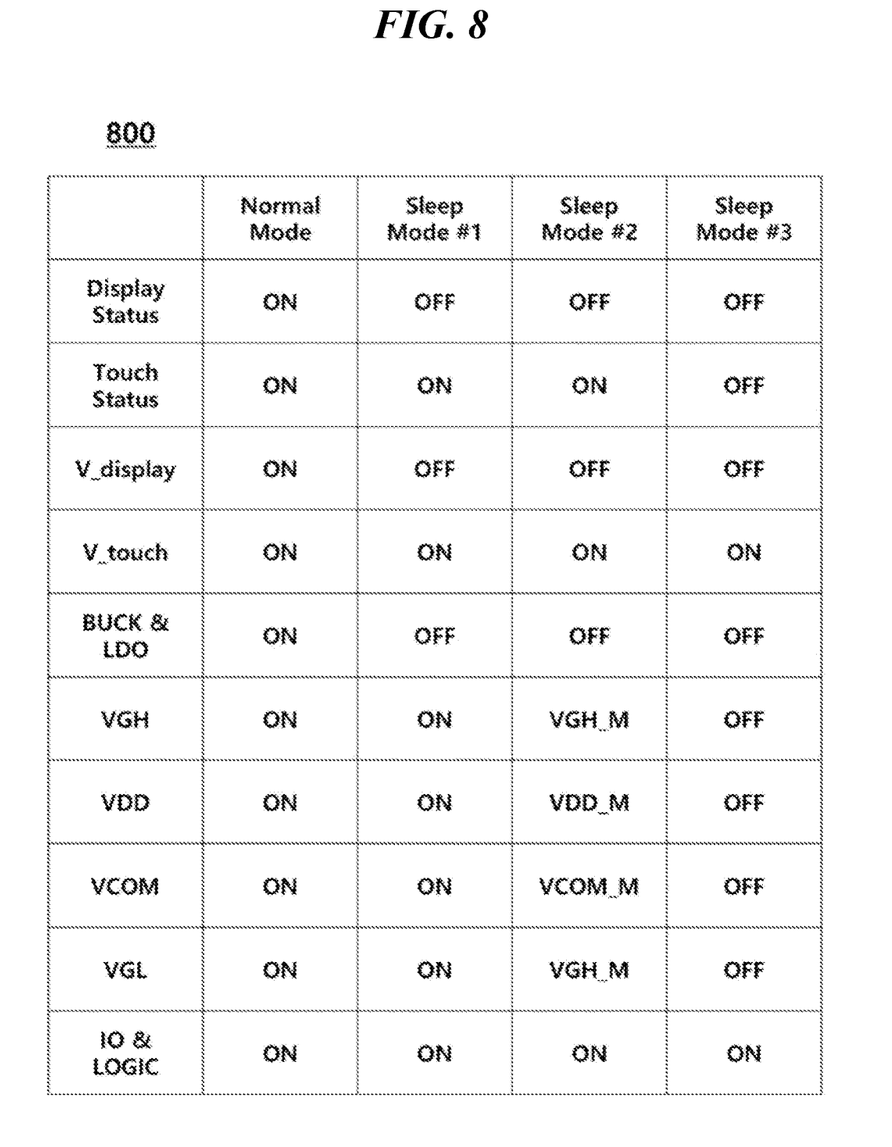
FIG. 8 is a diagram for describing a sleep mode of a panel according to the present disclosure.

The TMCU 780 may switch the driving mode from the deep sleep mode to the sleep mode or the normal mode based on a USB communication or I2C communication result with the host 710. FIG. 8 is a diagram for describing a sleep mode of a panel according to the present disclosure.

Referring to FIG. 8, the driving mode 800 of the panel may determine signals transmitted and received by the power management integrated circuit.

When the panel is in the normal mode, the display operation may be maintained in the on state and the touch operation may be maintained in the on state. In this case, the power management integrated circuit may receive both the display voltage V_display and the touch voltage V_touch.

When the panel is in the normal mode, the buck circuit of the power management integrated circuit may be maintained in the on state, and the gate high voltage VGH, the touch/display driving voltage VDD, the common voltage VCOM, gate low voltage VGL, and logic voltage LOGIC may be generated.

When the panel is in the first sleep mode (Sleep Mode #1), the display operation may be maintained in the off state and the touch operation may be maintained in the on state. In this case, the power management integrated circuit may not receive the display voltage V_display, but receive only the touch voltage V_touch.

When the panel is in the first sleep mode (Sleep Mode #1), the buck circuit of the power management integrated circuit may be maintained in the off state, and the gate high voltage VGH, the touch/display driving voltage VDD, the common voltage VCOM, the gate low voltage VGL, and the logic voltage LOGIC may be generated.

When the panel is in the second sleep mode (Sleep Mode #2), the display operation may be maintained in the off state and the touch operation may be maintained in the on state. In this case, the power management integrated circuit may not receive the display voltage V_display, but receive only the touch voltage V_touch.

When the panel is in the second sleep mode (Sleep Mode #2), the buck circuit of the power management integrated circuit may be maintained in the off state, and the modulated gate high voltage VGH_M, the modulated touch/display driving voltage VDD_M, the modulated common voltage VCOM_M, the modulated gate low voltage VGL_M, and the logic voltage LOGIC may be generated.

When the panel is in the third sleep mode (Sleep Mode #3), the display operation may be maintained in the off state and the touch operation may be maintained in the off state. In this case, the power management integrated circuit may not receive the display voltage V_display and the touch voltage V_touch.

When the panel is in the third sleep mode (Sleep Mode #3), the buck circuit, the gate high voltage generation circuit, the driving voltage generation circuit, and the gate low voltage generation circuit may be maintained in the off state in order to perform the basic function without performing the display function and the touch function, and the gate high voltage VGH, the touch/display driving voltage VDD, the common voltage VCOM, and the gate low voltage VGL may not be generated.

When the panel is in the third sleep mode (Sleep Mode #3), the logic circuit may be maintained in the on state, and may generate logic voltage LOGIC and transfer the logic voltage to the TMCU.

When the panel is in the third sleep mode (Sleep Mode #3), the host applies the wake-up signal to the TMCU to reduce the power consumption. The above operation may be implemented by a scheme of maintaining the multiplexer, the TMCU, etc., which communicate with the host interface (I/F) in the on state in order to receive the wake-up signal, and maintaining the remaining circuits in the off state.

As necessary, the third sleep mode may be defined as the deep sleep mode, and managed by distinguishing the first sleep mode from the second sleep mode.

In FIG. 8, the first sleep mode, the second sleep mode, and the third sleep mode may be examples of the sleep mode determined according to the circuit configuration of the power management integrated circuit.

Figure 9:
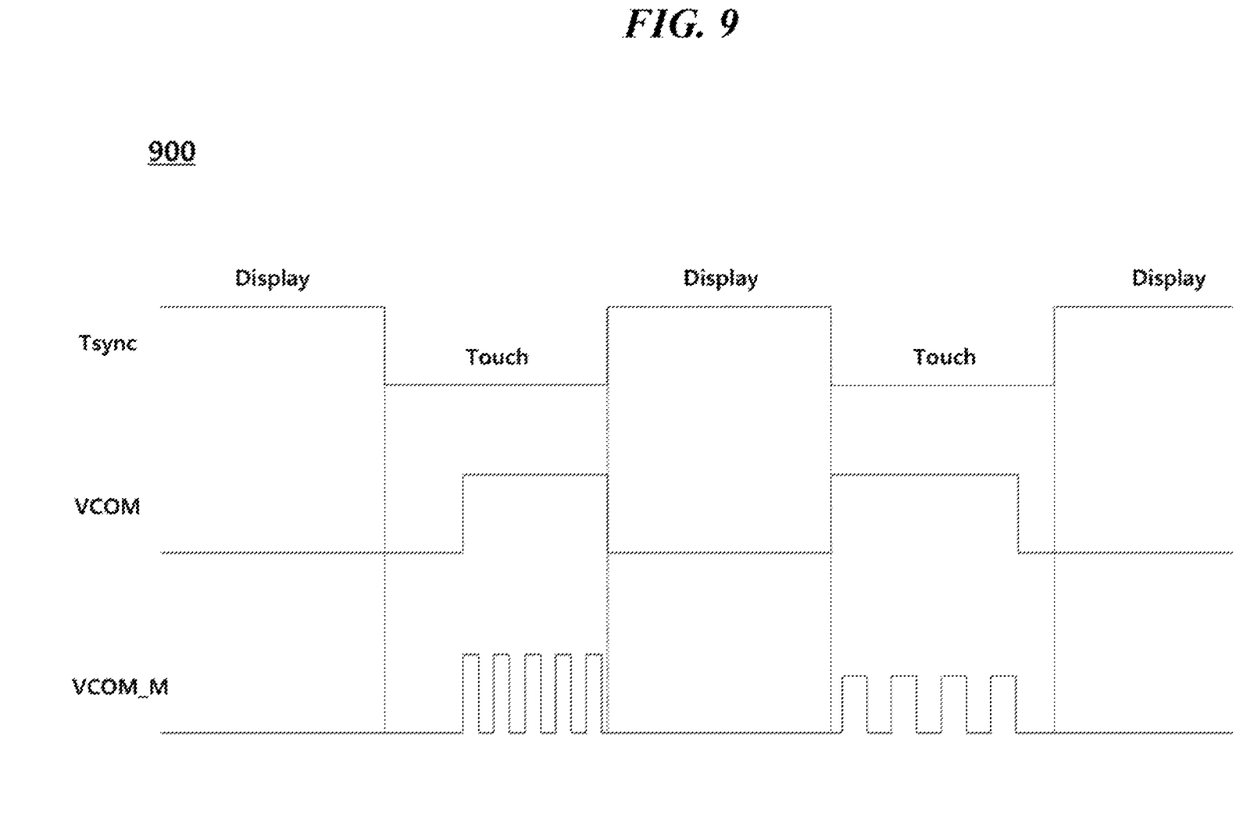
FIG. 9 is a diagram for describing a method for modulating a signal depending on a voltage modulation circuit according to the present disclosure.

FIG. 9 is a diagram for describing a method for modulating a signal depending on a voltage modulation circuit according to the present disclosure.

Referring to FIG. 9, a signal modulation method 900 of the voltage modulation circuit may be represented by comparing the timing synchronization signal Tsync, the common voltage VCOM, and the modulated common voltage VCOM_M.

The timing synchronization signal Tsync may be divided into a display driving period and a touch driving period in order to time-division drive the panel.

The common voltage VCOM may be maintained in a high/low state in the entirety or a part of the touch driving period of the timing synchronization signal Tsync. As the common voltage VCOM is changed to the high or low state, the timing of the rising edge or the falling edge may be determined, and may be utilized for determining the operation timing of the internal circuit.

In the case of the modulated common voltage VCOM_M, the common voltage VCOM may be modulated into a predetermined waveform such as a square wave, a sine wave, etc., and the strength, the timing, a frequency, etc., of the signal may be variously set.

The signal modulation method 900 of FIG. 9 is used for exemplifying the signal modulation method of the voltage modulation circuit 538 of FIG. 5, and the technical spirit of the present disclosure is not limited thereto.

It will be apparent to those skilled in the art that various modifications and variations can be made in the power management integrated circuit and the display device including the same of the present disclosure without departing from the spirit or scope of the aspects. Thus, it is intended that the present disclosure covers the modifications and variations of the aspects provided they come within the scope of the appended claims and their equivalents.

What is claimed is:

1. A power management integrated circuit comprising:
   a multiplexer configured to receive a display voltage or a touch voltage transferred by a host, select one of the display voltage and the touch voltage, and output a multiplexer output voltage;
   a buck circuit configured to receive the multiplexer output voltage, reduce a signal level of the multiplexer output voltage, and generate a driving voltage of a timing controller; and
   a voltage modulation circuit configured to receive the multiplexer output voltage and generating a gate high voltage, a gate low voltage, a common voltage, and a touch/display driving voltage,
   wherein the voltage modulation circuit is configured to modulate and output a waveform of at least one of the gate high voltage, the gate low voltage, the common voltage, and the touch/display driving voltage,
   wherein the multiplexer is configured to receive the display voltage as an enable signal to determine an output timing of the multiplexer output voltage.

2. The power management integrated circuit of claim 1, wherein the multiplexer is configured to receive the display voltage in a first driving mode of a panel and receive the touch voltage in a second driving mode of the panel.

3. The power management integrated circuit of claim 1, wherein the multiplexer is configured to change a type of the multiplexer output voltage in response to timings of a rising edge and a falling edge of a timing synchronization signal generated by the timing controller.

4. The power management integrated circuit of claim 1, wherein the buck circuit is configured to generate the driving voltage of the timing controller in the first driving mode of the panel and does not generate the driving voltage of the timing controller in the second driving mode of the panel.

5. The power management integrated circuit of claim 1, wherein the buck circuit includes a switch circuit that selectively interrupts the multiplexer output voltage in response to an operation of the multiplexer.

6. The power management integrated circuit of claim 1, wherein the voltage modulation circuit is configured to transfer the modulated gate high voltage to a level shifter, transfer the modulated gate low voltage to the level shifter, transfer the modulated common voltage to a source readout integrated circuit, and transfer the modulated touch/display driving voltage to the source readout circuit.

7. The power management integrated circuit of claim 1, wherein the power management integrated circuit is configured to turn on or turn off an output of the buck circuit according to a timing of a touch control signal generated by a touch microcontroller unit.

8. A power management integrated circuit comprising:
   a multiplexer configured to receive a first input voltage in a first driving mode, receive a second input voltage in a second driving mode, select one of the first input voltage and the second input voltage, and output the selected input voltage as a multiplexer output voltage;
   a buck circuit configured to lower a signal level of the multiplexer output voltage and transfer the multiplexer output voltage to a timing controller; and
   a source readout voltage modulation circuit configured to change a signal waveform of the multiplexer output voltage and generate a modulated touch/display driving voltage and a common voltage,
   wherein the source readout voltage modulation circuit is configured to provide the modulated touch/display driving voltage and the modulated common voltage to a source readout circuit so as to perform both a display driving and a touch driving in the first driving mode,
   wherein an output port of the multiplexer is configured to transfer the multiplexer output voltage by forming a common node with the buck circuit and the source readout voltage modulation circuit disposed inside the power management integrated circuit.

9. The power management integrated circuit of claim 8, further comprising:
   a level shifter voltage modulation circuit configured to generate a modulated gate high voltage and a modulated gate low voltage by changing the signal waveform, and provide the modulated gate high voltage and the modulated gate low voltage to a level shifter.

10. The power management integrated circuit of claim 8, wherein the multiplexer is disposed inside the power management integrated circuit and is configured to receive a multiplexer control signal for selecting the first input voltage or the second input voltage and change a type of the multiplexer output voltage.

11. The power management integrated circuit of claim 8, wherein the buck circuit is maintained in an on-state in the first driving mode and in an off-state in the second driving mode.

12. The power management integrated circuit of claim 8, wherein the buck circuit is electrically connected to a buck switch for changing a connection relationship of an internal circuit configuration in response to the first driving mode and the second driving mode.

13. The power management integrated circuit of claim 8, wherein the multiplexer is configured to receive the first input voltage through a first input signal line and receive the second input voltage through a second input signal line,
   wherein the second input signal line is formed a common node with a third input signal line which is electrically connected to a touch microcontroller unit, and
   wherein the third input signal line is configured to transfer the second input voltage to the touch microcontroller unit determining an operation timing of the multiplexer.

14. The power management integrated circuit of claim 8, wherein the source readout voltage modulation circuit is configured to transfer the common voltage to the source readout circuit in the second driving mode.

15. A display device comprising:
   a source readout circuit configured to perform a touch/display operation of a panel;
   a timing controller configured to determine a timing of the touch-display operation of the source readout circuit;

a power management circuit configured to generate a voltage transferred to the timing controller or the source readout circuit; and a touch microcontroller unit configured to control an operation of the power management circuit, wherein the power management circuit includes:

a multiplexer configured to selectively output a first input voltage or a second input voltage, a buck circuit configured to receive an output signal of the multiplexer and control a signal level, and provide the output signal to the timing controller, and a voltage modulation circuit disposed separately from the buck circuit and configured to determine a signal waveform transferred to the source readout circuit, wherein the power management circuit is configured to selectively turn on/off at least a part of power transferred to an internal circuit of the voltage modulation circuit to control a signal transferred to the touch microcontroller unit.

16. The display device of claim 15, wherein the touch microcontroller unit is configured to control the multiplexer to output the first input voltage in a first mode and control the multiplexer to output the second input voltage in a second mode.

17. The display device of claim 15, wherein the buck circuit is configured to receive the first input voltage in the first mode, transfer the first input signal after voltage drop, and interrupt the second input voltage in the second mode.

* * * * *